United States Patent [19]
Grieger

[11] Patent Number: 6,118,282
[45] Date of Patent: Sep. 12, 2000

[54] SENSOR APPARATUS

[75] Inventor: Bernd Grieger, Greenwood, Ind.

[73] Assignee: Endress & Hauser GmbH & Co., Germany

[21] Appl. No.: 09/067,959

[22] Filed: Apr. 29, 1998

Related U.S. Application Data

[63] Continuation-in-part of application No. 08/735,736, Oct. 23, 1996, Pat. No. 5,827,985, which is a continuation-in-part of application No. 08/574,818, Dec. 19, 1995, Pat. No. 5,661, 251
[60] Provisional application No. 60/043,992, May 2, 1997.
[51] Int. Cl.⁷ .......................... G01R 27/32; G01D 21/00
[52] U.S. Cl. ......................... 324/637; 324/696; 73/866.5
[58] Field of Search .................... 324/637, 696, 324/640, 643; 73/209 V, 290 R, 866.5, 304

[56] References Cited

U.S. PATENT DOCUMENTS

| | | |
|---|---|---|
| 2,955,466 | 10/1960 | Coles . |
| 3,339,411 | 9/1967 | Riffie . |
| 3,367,183 | 2/1968 | Webster . |
| 3,634,680 | 1/1972 | Myrah ..................................... 324/506 |
| 3,832,900 | 9/1974 | Ross . |
| 3,922,914 | 12/1975 | Fuchs . |
| 3,995,212 | 11/1976 | Ross . |
| 4,010,537 | 3/1977 | Oxenreider . |

(List continued on next page.)

FOREIGN PATENT DOCUMENTS

| | | |
|---|---|---|
| 0 260 113 | 3/1988 | European Pat. Off. . |
| 0 534 654 | 3/1993 | European Pat. Off. . |
| 1 230 548 | 4/1960 | France . |
| 1 648 163 | 4/1970 | Germany . |
| 27 44 864 | 4/1979 | Germany . |
| 33 37 690 | 4/1985 | Germany . |
| 41 18 715 | 12/1992 | Germany . |
| 42 04 414 | 6/1993 | Germany . |
| 43 08 373 | 9/1994 | Germany . |
| 44 04 745 | 8/1995 | Germany . |
| 2 064 128 | 6/1981 | United Kingdom . |
| 1 599 695 | 11/1981 | United Kingdom . |
| 2 079 950 | 1/1982 | United Kingdom . |
| 93 24812 | 12/1993 | WIPO . |

OTHER PUBLICATIONS

Arcone, Steen, Conductivity limitations in single–reflection time–domain reflectometry, J. Phys. E: Sci. Instrum 19 ((no month available) 1986), pp. 1067–1069.

Primary Examiner—Safet Metjahic
Assistant Examiner—Anjan Deb
Attorney, Agent, or Firm—Bose McKinney & Evans LLP

[57] ABSTRACT

A sensor apparatus (1) is provided for transmitting electrical pulses from a signal line into and out of a vessel to measure a process variable, for use in industrial applications and which is capable of withstanding variable and/or high pulling forces. The sensor apparatus (1) has a mounting section (7) configured to be coupled to the vessel, a cylindrical guide element (9) located inside the mounting section (7), which is prevented from moving in a direction toward the vessel, a conductive probe element (15) mounted inside the mounting section (7) and extending through the cylindrical guide element (9) into the vessel, a metallic insert (11) located inside the mounting section (7), pressed into the mounting section (7) in a direction towards the vessel by a spring element (13) and exerting a force on the guide element (9) in that direction, and an electrical connector (17) fastened to the metallic insert (11) and configured to couple the signal line directly to the probe element (15).

13 Claims, 3 Drawing Sheets

U.S. PATENT DOCUMENTS

| | | |
|---|---|---|
| 4,135,397 | 1/1979 | Krake . |
| 4,301,681 | 11/1981 | Maltby et al. . |
| 4,322,832 | 3/1982 | Sartorius . |
| 4,408,822 | 10/1983 | Nikitas . |
| 4,449,405 | 5/1984 | Franz et al. . |
| 4,465,088 | 8/1984 | Vosper . |
| 4,507,521 | 3/1985 | Goellner . |
| 4,713,538 | 12/1987 | Theocharous . |
| 4,944,861 | 7/1990 | Reber . |
| 5,122,740 | 6/1992 | Cottam et al. . |
| 5,122,800 | 6/1992 | Philipp . |
| 5,272,921 | 12/1993 | Foller et al. . |
| 5,305,237 | 4/1994 | Dalrymple et al. . |
| 5,323,361 | 6/1994 | Elle et al. . |
| 5,339,861 | 8/1994 | Smith, III . |
| 5,345,471 | 9/1994 | McEwan . |
| 5,361,070 | 11/1994 | McEwan . |
| 5,376,888 | 12/1994 | Hook . |
| 5,391,839 | 2/1995 | Lang et al. . |
| 5,420,517 | 5/1995 | Skaling et al. . |
| 5,457,990 | 10/1995 | Oswald et al. . |
| 5,609,059 | 3/1997 | McEwan . |
| 5,656,774 | 8/1997 | Nelson et al. . |
| 5,827,985 | 10/1998 | Grieger et al. ................ 73/866.5 |
| 5,841,028 | 11/1998 | Bray et al. ................ 73/290 V |
| 5,955,684 | 9/1999 | Gravel et al. ................ 73/866.5 |

SENSOR APPARATUS

This application claims the benefit of U.S. Provisional application Ser. No. 60/043,992, filed May 2, 1997; and is a continuation-in-part of application Ser. No. 08/735,736, filed Oct. 23, 1996, U.S. Pat. No. 5,827,985 which is a continuation-in-part of application Ser. No. 08/574,818, filed Dec. 19, 1995, U.S. Pat. No. 5,661,251.

BACKGROUND AND SUMMARY OF THE INVENTION

The present invention relates to a sensor apparatus for transmitting electrical pulses from a signal line into and out of a vessel to measure a process variable. A single conductor surface wave transmission line (Goubau line) is adapted as a sensor for industrial process variable measurement, in particular for level measurement. Such devices are intended for use for example in the process and storage industry.

A pulse sent down a probe is affected by any change of the electrical properties of the surroundings of the probe. A material located inside the vessel for example causes a change in electrical impedance at the material surface. At least part of the pulse will thus be reflected at the surface. The level of the material inside the vessel can be determined from the time required for the pulse to propagate to the surface and back.

Other process variables can be determined. The amplitude of a reflected pulse for example is a measure of the change in impedance at the reflecting surface and can be used to determine the dielectric constant of the material. Also it is feasible to measure thickness and/or dielectric constants of layers of different materials stored in a vessel from the amplitude and the time-of-flight of the respective number of reflected pulses.

Recent developments by the National Laboratory System now make it possible to generate fast, low power pulses, and time their return with very inexpensive circuits. See, for example, U.S. Pat. Nos. 5,345,471 and 5,361,070 assigned to The Regent of the University of California. The pulses generated by this new technology are broadband, and also are not square wave pulses. In addition, the generated pulses have a very low power level. Such pulses are at a frequency of 100 MHz or higher and have an average power level of about 1 nano Watt or lower. These factors present new problems that must be overcome to transmit the pulse down and back and to process and interpret the returned pulses.

It is of essential importance to provide a design for the sensor apparatus which ensures a high mechanical stability suitable for industrial applications while at the same time maintaining the electrical operation of a Goubau line. This includes ensuring a smooth impedance transition of the pulse from the signal line and transmission through the mounting to the probe and vice versa. Changes in electrical impedance throughout the apparatus, i.e. the signal line, the mounting area and the probe inside and outside the mounting section are to be avoided. Every electrical impedance discontinuity causes a partial reflection of energy of the pulse and thus reduces the signal to noise ratio.

In copending U.S. patent application Ser. No. 08/574,818 entitled SENSOR APPARATUS FOR PROCESS MEASUREMENT filed on Dec. 19, 1996 and a related Continuation in Part Application U.S. Patent Application Serial No. 08/735,736 with the same title filed on Oct. 23, 1996 sensor apparati for transmitting electrical pulses from a signal line into and out of a vessel to measure a process variable are described.

A sensor apparatus is described comprising:
a mounting section configured to be coupled to the vessel,
a cylindrical guide element located inside the mounting section,
means for preventing a movement of the guide element in a direction toward the vessel,
a conductive probe element mounted inside the mounting section and extending through the cylindrical guide element into the vessel,
a metallic insert located inside the mounting section, and
an electrical connector
  coupled to the probe element,
  configured to couple the signal line to the probe element.

The insert comprises a thread and is screwed into the mounting section in a direction towards the vessel. It prevents a movement of the guide element in a direction away from the vessel. It is also described, that the insert alternately may be snapped in and held with a spring element and a retaining ring. The insert includes an air filled conical cavity. A conical steel nut, serving as an impedance transitioning element and as an intermediate connecting element, is located within the cavity and a high frequency electrical connector is coupled to an end of the nut facing away from the vessel via a pin with decreased diameter. This pin is slidable within an aperture of the cone to permit some movement of the probe element. Such a movement may occur for example when pulling forces act on the probe. This design is suitable for industrial applications, e.g. for measuring the level of a liquid in a vessel, where pulling forces are fairly constant or vary slowly with time. In applications where the probe is subjected to abrupt changes of the pulling forces, e.g. for measuring the level of solids, this design shows some disadvantages. If the position of the conical steel nut with respect to the insert is altered, the impedance matching essential for a smooth impedance transition from the signal line to the probe is impaired. Also a movement of the pin within the connector may change the electric properties of the connector and thus affect the quality of the signal transition.

It is an object of the invention to provide a sensor apparatus which can be used in industrial applications, which has a high mechanical stability, tight pressure seals and which can withstand high pulling forces while at the same time maintaining effective level, distribution, transition and control of high frequency impedances throughout the sensor apparatus.

To this end the invention comprises a sensor apparatus for transmitting electrical pulses from a signal line into and out of a vessel to measure a process variable, the sensor apparatus comprising:
a mounting section configured to be coupled to the vessel,
a cylindrical guide element located inside the mounting section,
means for preventing a movement of the guide element in a direction toward the vessel,
a conductive probe element mounted inside the mounting section and extending through the cylindrical guide element into the vessel
a metallic insert located inside the mounting section,
  pressed into the mounting section in a direction towards the vessel by a spring element and exerting a force on the guide element in that direction, and
an electrical connector
  fastened to the metallic insert and configured to couple the signal line directly to the probe element.

According to a refinement of the invention, the axial length of the guide element is large compared to an outer diameter of the probe element.

According to a refinement of the invention the means for preventing a movement of the guide element in a direction toward the vessel is an outwardly tapered outer surface of the guide element abutting on an outwardly tapered inner surface of the mounting section.

According to a refinement of the invention the probe element includes a head portion comprising an outwardly tapered surface facing towards the vessel and engaging an outwardly tapered inner surface of the guide element located adjacent to a surface of the guide element facing away from the vessel.

According to a refinement of the invention a dielectric insert is located inside the mounting section between the guide element and the metallic insert.

According to a refinement of the invention the probe element includes a head portion comprising an inwardly tapered surface facing away from the vessel and engaging an inwardly tapered surface of the dielectric insert.

According to a refinement of the invention a recess is located within the head portion of the probe element forming a backing support for a male pin of the electrical connector.

According to a refinement of the invention the probe element comprises a hollow cylinder extending in a direction away from the vessel toward the connector and the male pin of the connector extends through the hollow cylinder.

According to a refinement of the invention the probe element has an elongated section extending into the vessel.

According to a refinement of the invention the elongated section comprises a hollow section facing toward the vessel and wherein one end of a probe extension, in particular a rod or a wire, is mounted inside the hollow section.

According to a refinement of the invention the metallic insert is electrically connected to ground potential.

According to a refinement of the invention the guide element is made of a dielectric material.

According to a refinement of the invention a first seal, in particular an o-ring, is provided between the mounting section and the dielectric insert and a second seal, in particular an o-ring, is provided between the probe element and the dielectric insert.

The invention and its advantages are explained in more detail using the figures of the drawing, in which an exemplary embodiment is shown. The same reference numerals refer to the same elements throughout the figures.

DETAILED DESCRIPTION OF THE DRAWINGS

Figure 1:
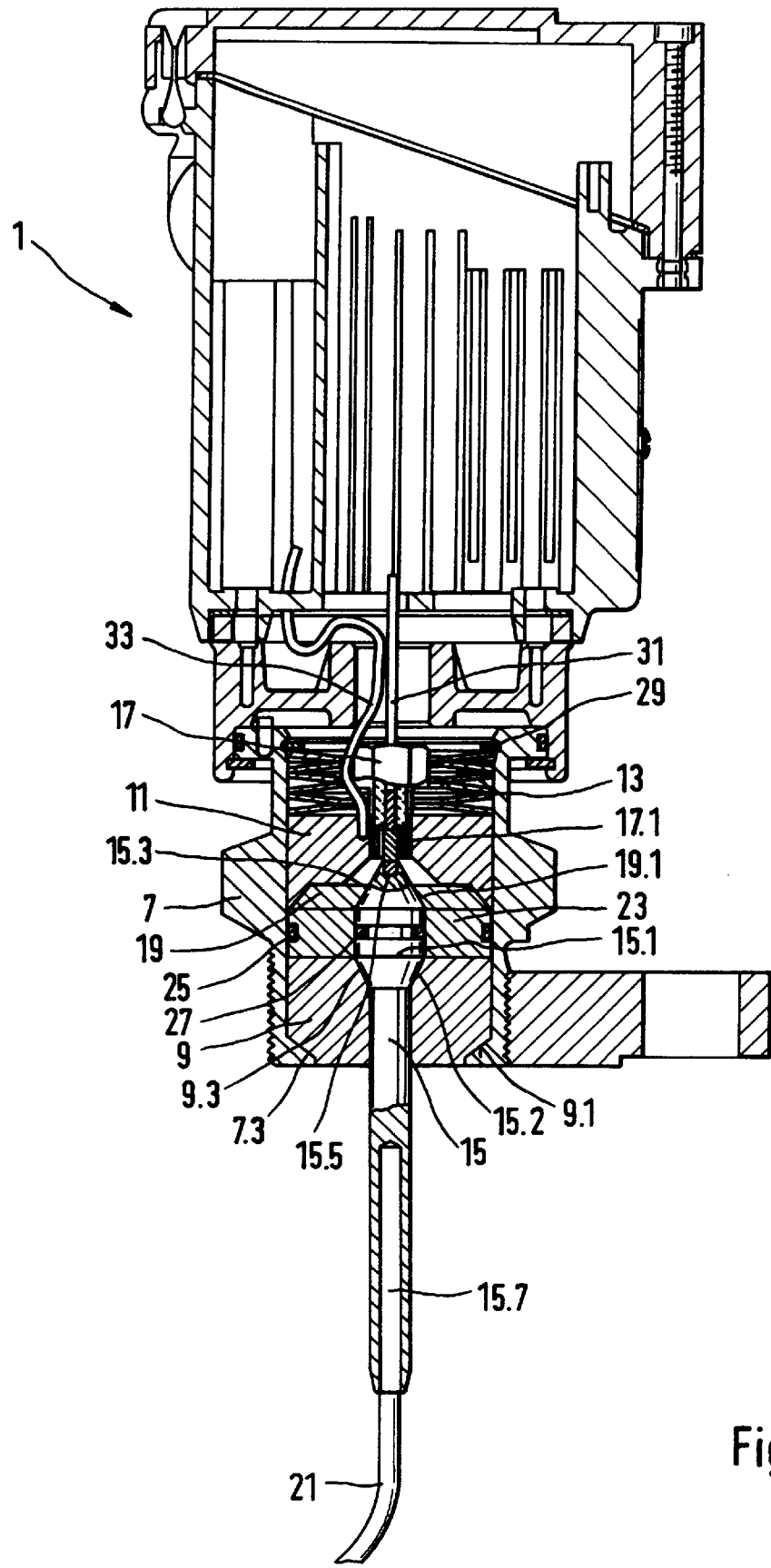
FIG. 1 shows a longitudinal section of a sensor apparatus.

FIG. 1 shows a longitudinal section of a sensor apparatus 1 for transmitting electrical pulses from a signal line into and out of a vessel to measure a process variable. The vessel is not shown. It could be a tank or a storage basin, a storage bin or any other type of container.

The sensor apparatus 1 comprises an essentially cylindrical mounting section 7 which is configured to be coupled to the vessel. In the embodiment shown in FIG. 1 the mounting section 7 comprises a thread located at the end of the mounting section 7 facing towards the vessel. It is designed to be fastened to a flange, as shown in FIG. 1 on the right hand side of the mounting section 7, or to be screwed into a threaded opening located on the vessel. Other methods of mounting a sensor apparatus 1 to a vessel, e.g. by welding the mounting section 7 to the vessel, are also possible.

The mounting section 7 has a central aperture extending through the same. A cylindrical guide element 9 is located inside the mounting section 7. It consists of a dielectric material, preferably of Polytetraflourethylen (PTFE) which ensures a high chemical resistivity. Other materials, i.e. Polyphenylensulfid (PPS), Plyetherimid (PEI), Polyeheretherketon (PEEK) or Polyethylenterephthalat (PET) are also feasible.

Means are provided for preventing a movement of the guide element 9 in a direction toward the vessel. In the embodiment shown in FIG. 1 these means comprise an outwardly tapered inner surface 7.3 of the mounting section 7 located near the end of the mounting section 7 facing towards the vessel. The guide element 9 has an identically shaped outwardly tapered outer surface 9.1 which abuts on the outwardly tapered inner surface 7.3 of the mounting section 7.

For the scope of this application the term outwardly tapered surface shall mean a surface defining a cone which has one end with a small diameter and another end with a larger diameter and the end with the larger diameter is facing away from the vessel. Accordingly the term inwardly tapered surface shall mean a surface defining a cone which has one end with a small diameter and another end with a larger diameter and the end with the larger diameter is facing toward the vessel.

Figure 2:
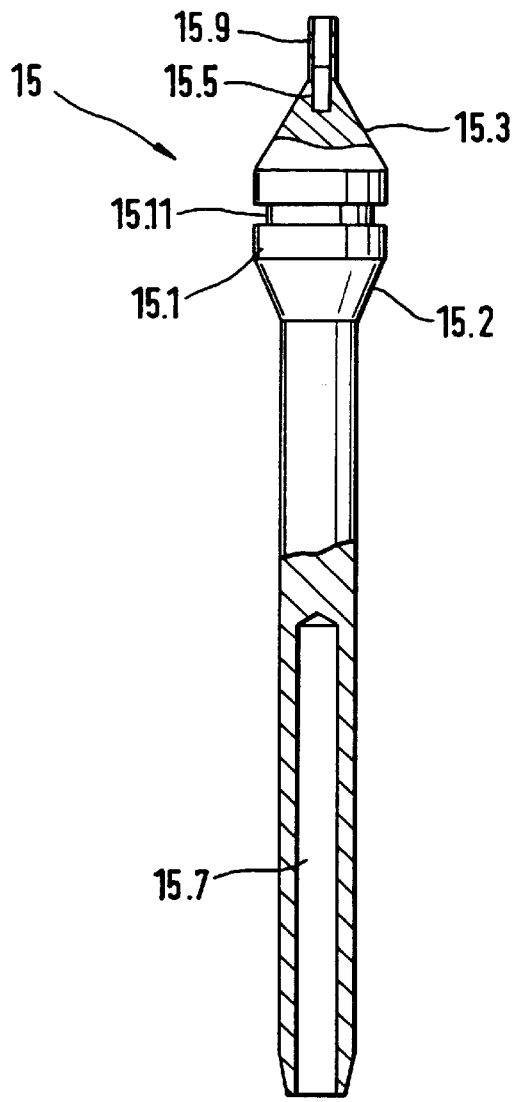
FIG. 2 shows a probe element of FIG. 1.

A conductive probe element 15, as shown in FIG. 2, is mounted inside the mounting section 7. It consists of a metal, preferably of stainless steel, which provides for high mechanical strength. It includes a head portion 15.1 and an elongated conductive portion extending away from the head portion 15.1. The elongated portion extends through the cylindrical guide element 9 into the vessel. The elongated portion may extend further into the vessel forming a single rigid rod element or it may comprise a solid or a flexible probe extension 21, in particular a rod or a wire. In the embodiment shown in FIG. 1, the elongated portion the probe element 15 has a hollow section 15.7 facing toward the vessel and a flexible probe extension 21, is mounted inside the hollow section 15.7. It is fastened inside the hollow section 15.7 for example by swaging or by one or more set screws. To keep the flexible extension 21 taught and straight, it is either to be fixed to the bottom of the vessel, or a weight is to be connected to the free end of the flexible extension 21.

The head portion 15.1 of the probe element 15 comprises a cylindrical portion, an outwardly tapered surface 15.2 and an inwardly tapered surface 15.3. The cylindrical portion is located between the two tapered surfaces 15.2, 15.3. The outwardly tapered surface 15.2 is located on a side of the cylindrical portion facing towards the vessel and the inwardly tapered surface 15.3 is located on a side of the cylindrical portion facing away from the vessel.

The guide element 9 has an outwardly tapered inner surface 9.3 located adjacent a surface of the guide element 9 facing away from the vessel. The outwardly tapered surface 15.2 of the probe element 15 engages the outwardly tapered inner surface 9.3 of the guide element 9 thus preventing a movement of the probe element 15 in a direction toward the vessel. In a preferred embodiment, the axial length of the guide element 9 is large compared to an outer diameter of the probe element 15. Such a design provides high mechanical stability. The probe 15 is not only capable of withstanding high pulling forces, it is also protected against lateral movement. This ensures that the more fragile electrical connections that will be described later on remain unimpaired.

A dielectric insert is located inside the mounting section 7 on top of the guide element 9. The insert may be a single element or it may consist of two or more elements. In the embodiment shown in FIG. 1 the insert consists of two elements 19,23. A first element 23 has the shape of a hollow cylinder and closely surrounds the cylindrical portion of the head portion 15.1 of the probe element 15. It is located inside the mounting element 7 between the guide element 9 and a second essentially cone shaped element 19 of the dielectric insert. The second element 19 comprises a central aperture with an inwardly tapered surface 19.1 which engages the inwardly tapered surface 15.3 of the head portion 15.1 of the probe element 15 facing away from the vessel.

A first seal 25, in particular an o-ring, is provided between the mounting section 7 and the first element 23 of the dielectric insert. It is positioned within a ring-shaped groove located on the outer cylindrical surface of the first element 23 of the dielectric insert.

A second seal 27, in particular an o-ring, is provided between the probe element 15 and the first element 23 of the dielectric insert. It is positioned within a ring-shaped groove 15.11 located on the outer cylindrical surface of the cylindrical portion of the head 15.1 of the probe element 15.

A metallic insert 11 is located inside the mounting section 7 abutting on the second element 19 of the dielectric insert. Preferably the metallic insert 11 is stainless steel. It is electrically connected to ground potential. In the embodiment shown in the figures, a wire 33 connected to ground potential is positioned inside an opening 11.5 in the metal insert 11.

The metallic insert 11 is pressed into the mounting section 7 in a direction towards the vessel by a spring element 13. In the embodiment shown in FIG. 1 the spring element 13 consists of a cylindrical pile of disc springs abutting on a surface of the metallic insert 11 facing away from the vessel. A retainer ring 29 is placed inside a groove within the mounting section 7. The spring element 13 is compressed between the surface of the metallic insert 11 and the retainer ring 29. It exerts a force in a direction toward the vessel on the metallic insert 11 which in turn is pressed against the dielectric insert, so that the dielectric insert exerts a force on the guide element 9 in a direction towards the vessel.

Smooth impedance transitions are provided for throughout the sensor apparatus. Preferably the electrical impedance inside the mounting section 7 is nearly constant and identical or similar to the electrical impedance of the signal line. This is achieved by the choice of material used for the metallic insert 11, the dielectric insert, the guide element 9 and the probe element 15 and the shape and the geometrical dimensions of these parts. Tapered surfaces for example ensure smooth impedance transitions. Abrupt diameter changes of the components are to be avoided wherever possible. Such optimization is especially important with lower power high frequency pulse signals to ensure maximum energy to be transferred to the probe element 15 by minimizing undesired reflections of pulse energy.

Figure 3:
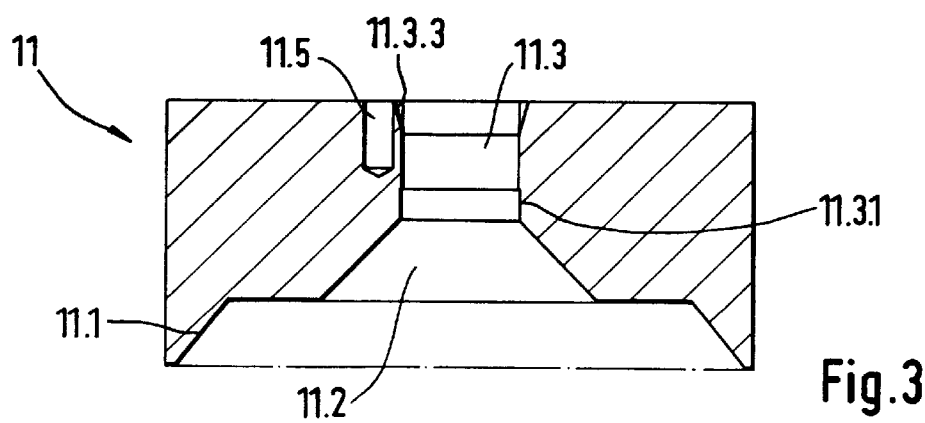
FIG. 3 shows an insert of FIG. 1.

The metallic insert 11 is shown in FIG. 3. A central aperture extends through the insert 11. It comprises essentially three sections. A first section facing toward the vessel has an inner inwardly tapered surface 11.1 which closely engages the outer inwardly tapered surface 19.1 of the second element 19 of the dielectric insert.

A second section includes a conical opening 11.2 surrounding at least part of the head 15.1 of the conductive probe element 15. It is understood that the conical opening 11.2 may be filled with a dielectric material, if this is necessary or desired to improve electrical transmission of the high frequency pulses. The shape, dimension of the opening 11.2 and if desired, the dielectric element filling it, are selected to provide the desired impedances.

A third section facing away from the vessel is essentially cylindrical and has a central bore 11.3 extending through it. A high frequency electrical connector 17 is fastened to the metallic insert 11 inside the bore 11.3. The connector 17 is configured to couple the signal line to the probe element 15.

Figure 4:
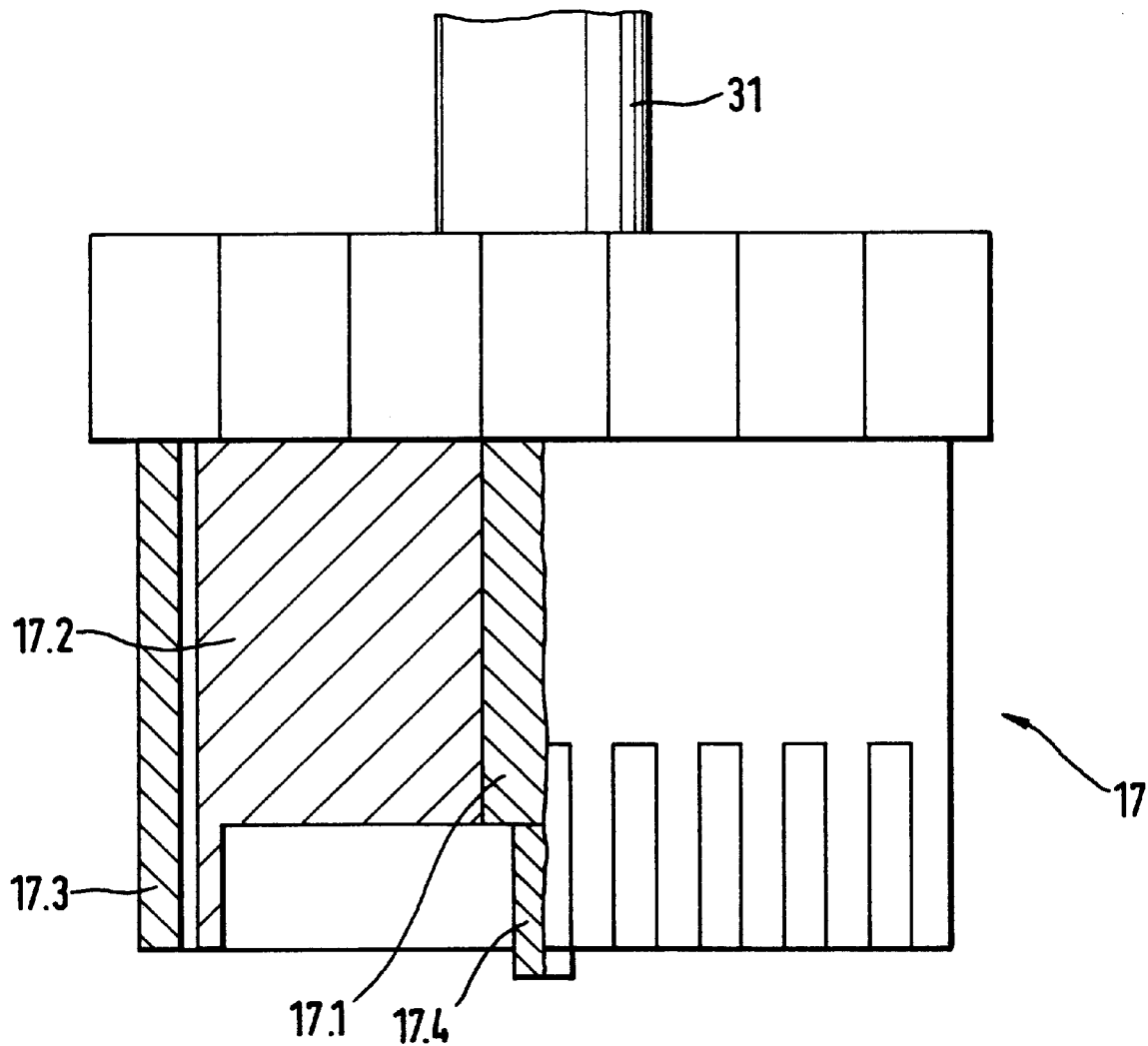
FIG. 4 shows a connector of FIG. 1.

The connector 17 is shown in FIG. 4. It comprises an inner conductor 17.1 surrounded by an insulating material 17.2. The inner conductor 17.1 and the insulating material 17.2 are positioned inside a metallic sleeve 17.3. One side of the connector 17 facing away from the vessel is designed to be coupled to the signal line. Since high frequency pulses are to be transmitted the signal line is preferably a coaxial cable 31. The coaxial cable 31 comprises an inner conductor and an outer conductor. The inner conductor of the coaxial cable 31 is connected to the inner conductor 17.1 of the connector 17. The outer conductor of the coaxial cable 31 is connected to the metallic sleeve 17.3 which forms the outer conductor of the connector 17.

The metallic sleeve 17.3 can either be irreleasably fixed to the metallic insert 11, e.g. welded to it, or it can be fastened to it by a snap fit connection. FIG. 3 and 4 show one embodiment of a snap fit connection. The central bore 11.3 of the metallic insert 11 comprises a section 11.3.1 with slightly enlarged inner diameter and the outer diameter of one end of the metallic sleeve 17.3 facing toward the vessel can be reduced slightly. The later is accomplished e.g. by cuts extending in axial direction inserted at that end of the metallic sleeve 17.3.

In order to facilitate the mounting of the connector 17, the metallic insert 11 comprises an outwardly tapered inner surface 11.3.3 located near the end of the metallic insert 11 facing away from the vessel. Thus the connector 17 is centered and slightly compressed when pushed into the metallic insert 11. An end-section of the connector 17 located inside the section 11.3.1 with enlarged inner diameter will slightly expand in diameter and thus hold the connector 17 inside the metallic insert 11. An incremental movement of the metallic insert 11 in axial direction will cause an identical incremental movement of the connector 17.

One end of the inner conductor 17.1 of the connector 17 forms a male pin 17.4. The probe 15 comprises a hollow cylinder 15.9 located adjacent to the inwardly tapered surface 15.3 and extending in a direction away from the vessel toward the connector 17. A cylindrical recess 15.5 is located within the head portion 15.1 of the probe element 15. The male pin 17.4 of the connector 17 extends through the hollow cylinder 15.9 and the recess 15.5 forms a backing support for it.

One advantage of this design is, that the signal line is coupled directly to the probe element 15. No further impedance transition elements or intermediate connecting elements, e.g. conical nuts, are needed. Energy losses occurring at impedance transitions are reduced, since less impedance transitions are necessary. Also less parts are necessary and assembly of the sensor apparatus is simplified. The electrical connection is accomplished by mounting the metallic insert 11 and by plugging the connector 17 into the metallic insert 11.

In case high pulling forces are exerted on the probe element 15 the spring element 13 ensures that all inserts inside the mounting section 7, i.e. the guide element 9, the elements 19, 23 of the dielectric insert, the metallic insert 11 and the probe element 15 exhibit no or only an incremental movement in axial direction. If an incremental movement occurs all inserts are displaced exactly the same distance in axial direction. The connector 17 is fastened to the metallic insert 11. Thus it will perform exactly the same movement as the metallic insert 11 does. Because of this, no movement of the connector 17 with respect to the probe element 15 occurs. Accordingly an incremental displacement of the probe element 15 does not impair the electrical connection between the probe element 15 and the electrical connector 17. The connection remains unimpaired even in applications where pulling forces may change very rapidly and/or frequently. Also the impedance matching which depends strongly on the shapes, the dimensions and the position of the relevant elements with respect to each other remains unchanged. Relevant in this context are the metallic insert 11, the elements 19, 23 of the dielectric insert, the guide element 9 and the probe element 15.

As described earlier in the text, the extensions of the cylindrical guide element 9 prevent a lateral movement of the probe element 15. Should a lateral movement occur it will only be incremental. Since the male pin 17.4 of the connector 17 extends through the hollow cylinder 15.9 into the recess 15.5 inside the probe element 15 and it is backed by the probe element 15 itself, the quality of the electrical connection is unaffected by such an incremental movement.

What is claimed is:

1. A sensor apparatus (1) for transmitting electrical pulses from a signal line into and out of a vessel to measure a process variable, the sensor apparatus (1) comprising:
    a mounting section (7) configured to be coupled to the vessel,
    a cylindrical guide element (9) located inside the mounting section (7),
    means for preventing a movement of the guide element (9) in a direction toward the vessel,
    a conductive probe element (15) mounted inside the mounting section (7) and extending through the cylindrical guide element (9) into the vessel
    a metallic insert (11) located inside the mounting section (7),
        pressed into the mounting section (7) in a direction towards the vessel by a spring element (13) and exerting a force on the guide element (9) in that direction, and
    an electrical connector (17)
        fastened to the metallic insert (11) and
        configured to couple the signal line directly to the probe element (15).

2. A sensor apparatus according to claim 1, wherein an axial length of the guide element (9) is large compared to an outer diameter of the probe element (15).

3. A sensor apparatus according to claim 1, wherein the means for preventing a movement of the guide element (9) in a direction toward the vessel is an outwardly tapered outer surface (9.1) of the guide element (9) abutting on an outwardly tapered inner surface (7.3) of the mounting section (7).

4. A sensor apparatus according to claim 1, wherein the probe element (15) includes a head portion (15.1) comprising an outwardly tapered surface (15.2) facing towards the vessel and engaging an outwardly tapered inner surface (9.3) of the guide element (9) located adjacent a surface of the guide element (9) facing away from the vessel.

5. A sensor apparatus according to claim 1, wherein a dielectric insert (19, 23) is located inside the mounting section (7) between the guide element (9) and the metallic insert (11).

6. A sensor apparatus according to claim 5, wherein the probe element (15) includes a head portion (15.1) comprising an inwardly tapered surface (15.3) facing away from the vessel and engaging an inwardly tapered surface (19.1) of the dielectric insert (19).

7. A sensor apparatus according to claim 1, wherein a recess (15.5) is located within the head portion (15.1) of the probe element (15) forming a backing support for a male pin (17.4) of the electrical connector (17).

8. A sensor apparatus according to claim 1, wherein the probe element (15) comprises a hollow cylinder (15.9) extending in a direction away from the vessel toward the connector (17) and the male pin (17.4) of the connector (17) extends through the hollow cylinder (15.9).

9. A sensor apparatus according to claim 1, wherein the probe element (15) has an elongated section extending into the vessel.

10. A sensor apparatus according to claim 9, wherein the elongated section comprises a hollow section (15.7) facing toward the vessel and wherein one end of a probe extension (21) is mounted inside the hollow section (15.7).

11. A sensor apparatus according to claim 1, wherein the metallic insert (11) is electrically connected to ground potential.

12. A sensor apparatus according to claim 1, wherein the guide element (9) is made of a dielectric material.

13. A sensor apparatus according to claim 5, wherein
    a first seal (25) is provided between the mounting section (7) and the dielectric insert (23) and
    a second seal (27) is provided between the probe element (15) and the dielectric insert (23).

* * * * *